July 27, 1965 S. SCHALKOWSKY 3,196,687
ABSOLUTE PRESSURE GAGE FOR ULTRA-HIGH VACUUM MEASUREMENT
Filed Aug. 30, 1962 4 Sheets-Sheet 3

FIG. 4

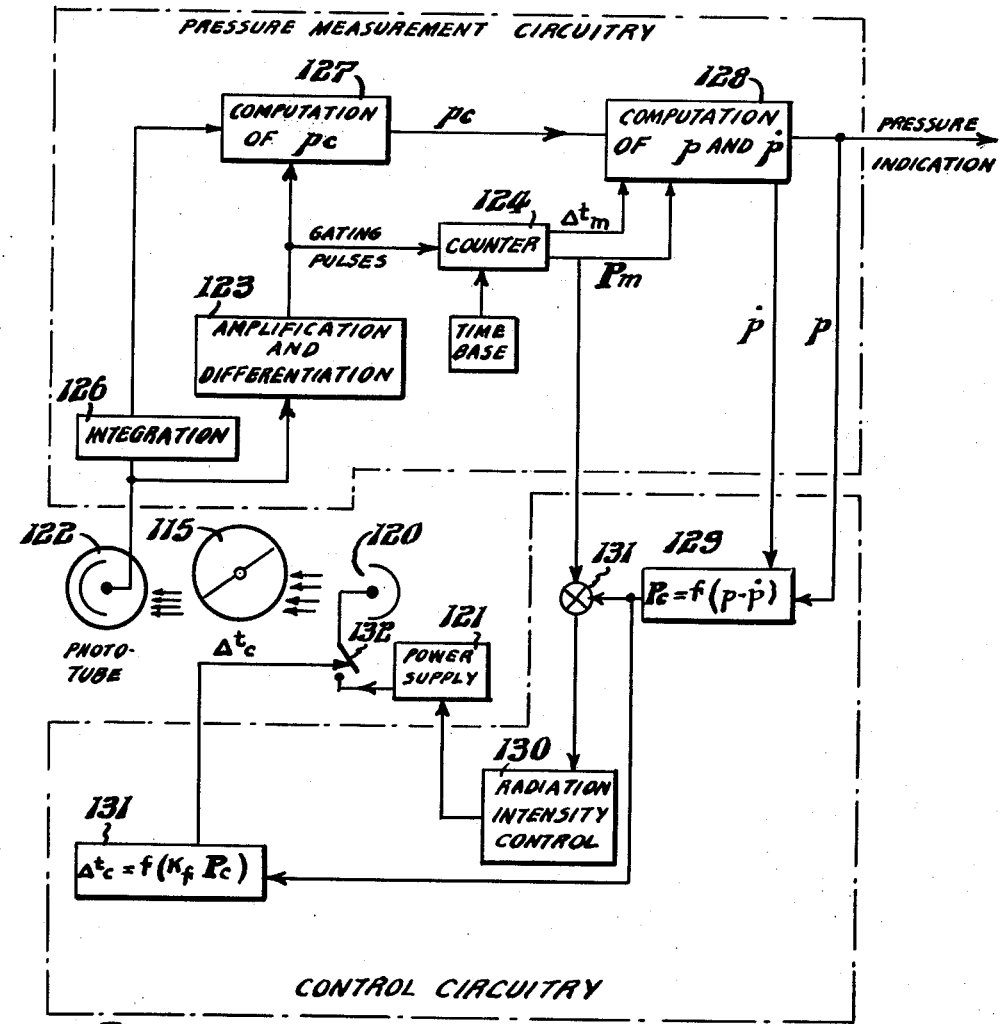

Code: $P_m$ = period of rotation - measured
$P_c$ = period of rotation - control
$p_c$ = radiation pressure
$p$ = pressure
$\dot{p}$ = rated change of gas pressure
$\Delta t_c$ = control torque pulse duration
$\Delta t_m$ = pulse duration, measured INVENTOR.
Samuel Schalkowsky,
BY
Paul & Paul
ATTORNEYS.

July 27, 1965 S. SCHALKOWSKY 3,196,687
ABSOLUTE PRESSURE GAGE FOR ULTRA-HIGH VACUUM MEASUREMENT
Filed Aug. 30, 1962 4 Sheets-Sheet 4
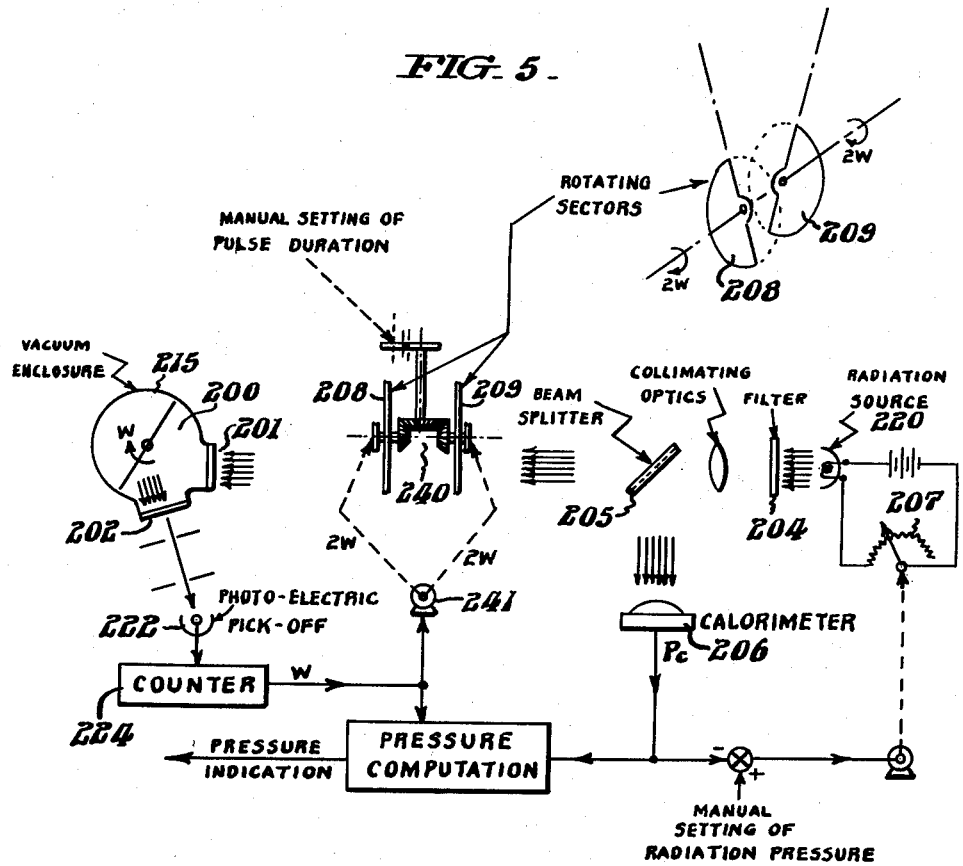
INVENTOR.
Samuel Schalkowsky,
BY
Paul & Paul
ATTORNEYS.

United States Patent Office 3,196,687
Patented July 27, 1965

3,196,687
ABSOLUTE PRESSURE GAGE FOR ULTRA-HIGH
VACUUM MEASUREMENT
Samuel Schalkowsky, Radnor, Pa.
(4003 Woodlawn Road, Chevy Chase, Md.)
Filed Aug. 30, 1962, Ser. No. 220,524
7 Claims. (Cl. 73—398)

This invention relates to a new absolute pressure gage for direct measurement of extremely low gas pressures, for example, pressures below $10^{-6}$ millimeters of mercury ($10^{-6}$ mm. Hg). The new gage provides a direct measure of gas pressure because it responds directly to the momentum transfer between the gas molecules and the sensing element; an absolute determination of the pressure is obtained from the measured quantities and knowledge of design parameters.

The new gage is to be distinguished from and contrasted with ionization gages and mass spectrometers which are currently dominant in the ultra-high vacuum field and which depend upon electrical interactions with ions which are produced and influenced by the application of external electrical and/or magnetic fields.

Ionization gages and mass spectrometers require a standard against which they can be calibrated and by means of which theoretical correlations between the output of the device and the gas pressure can be verified. Whereas these two functions can be accomplished with relative ease down to about $10^{-6}$ mm. Hg, for lower pressures, prior to my present invention, there was no reliable method for measuring the pressure directly. Knudsen radiometer gages and viscosity-type gages have been used in the laboratory to measure pressure as low as $10^{-8}$ mm. Hg, but this stretches the capability of these prior art devices, and below $10^{-8}$ mm. Hg there has been no practical method for absolute pressure measurement.

The object of my present invention is to provide a pressure gage for the direct and accurate measurement of gas pressures in a range whose upper limit starts at about $10^{-6}$ mm. Hg with a lower pressure limit of about $10^{-12}$ mm. Hg and even less.

My invention will be best understood from a reading of the following detailed description, and from the drawing, in which:

FIG. 4 is a diagram showing of a more elaborate pressure measurement system; and FIG. 5 is a diagram of another form of pressure gage employing the same basic concept as in FIGS. 1–4.

Figure 3:
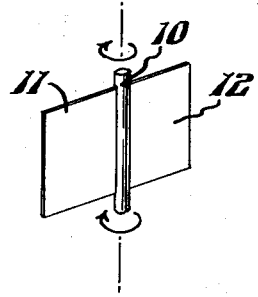

Referring now to the drawing, the pressure gage of the present invention utilizes a sensor element, one form of which is illustrated in FIG. 3. As there shown, the sensing element consists of a thin steel rod 10 which may, for example, have a diameter of the order of one millimeter and a length of one or two centimeters. The rod 10 is made of steel since, as will be described, it is to be suspended magnetically.

Attached to rod 10 are a pair of oppositely disposed wings 11 and 12 preferably made of non-conductive material having a highly reflecting surface obtained, for example, by applying an aluminum coating. Wings 11 and 12 may be about 0.2 inch thick, and each may be about one centimeter long and one centimeter wide.

The weight of such a wing assembly as just described above, to be suspended magnetically, would be of the order of 0.52 gram, and the moment of inertia about the axis of rotation be about 0.18 gram-centimeter squared. The moment arm would be 0.5 centimeter, and the area of each wing would, of course, be one square centimeter.

Figure 2:
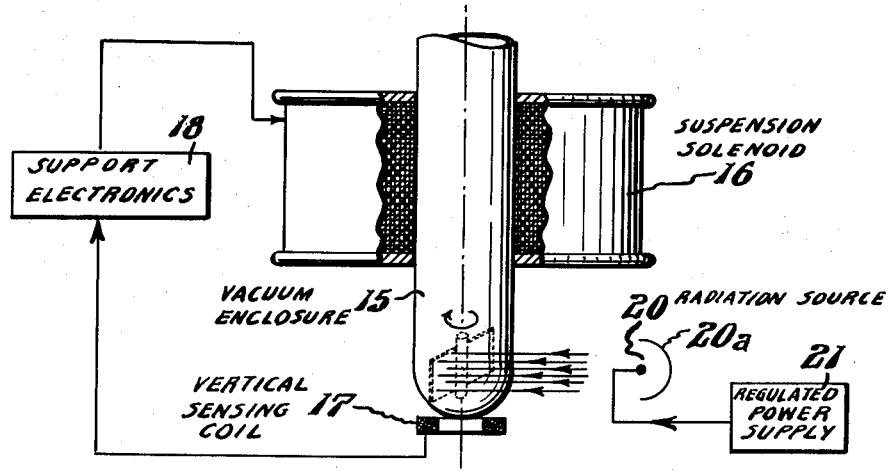
FIGS. 2 and 3 are schematic illustrations respectively of a form of sensor assembly and a form of sensing element which may be used in my new pressure gage.

As shown in FIG. 2, the wing assembly of FIG. 3 is suspended inside the vacuum enclosure 15 by a magnetic form of suspension. For a wing assembly having the dimensions mentioned above, the vacuum enclosure 15 would have a diameter slightly over 2 centimeters. The suspension means illustrated in FIG. 2 comprise the suspension solenoid 16, the vertical sensing coil 17, and the support electronics circuit represented by block 18. The basic elements of the magnetic suspension system shown in FIG. 2 may be similar to those used at the University of Virginia to suspend steel spheres and to rotate them to speeds of more than 280,000 revolutions per second. The magnetic suspension system used at the University of Virginia has been described in several technical articles, including the "Journal of Applied Physics," vol. 17, beginning at page 886 (1946), and the "Physical Review," vol. 100, No. 6, beginning at page 1658 (Dec. 15, 1955).

It will be seen from FIG. 2 that the wing assembly, magnetically suspended inside the vacuum enclosure 15, is free to rotate about the axis of the rod 10. All of the suspension components, other than the wing assembly, are located outside the vacuum enclosure 15. The magnetic form of suspension illustrated in FIG. 2 is suitable for my new pressure gage; however, other equivalent suspension means could be used.

As indicated diagrammatically in FIG. 2, radiation pressure from a radiation source 20 is applied to one side only of the wing assembly. That is, radiation pressure is applied to the wing on one side only of the rod 10. Since only one wing is thus exposed to the radiation pressure at a time, the radiation pressure causes the wing assembly to rotate about the axis of the rod 10. The rotation of the wing assembly is retarded by the drag torque due to any air or gas which may be present in the enclosure 15. The torque to sustain rotation at a desired rate of speed must, therefore, be supplied by the radiation pressure.

The magnetic form of suspension illustrated in FIG. 2 is a suitable type of suspension since experiments have shown that the time decrement measurement of the decay of rotation shows that the retarding torque is essentially that due to gas interaction alone. The suspension itself does not contribute any measurable drag torque.

*Principle of operation*

Figure 1:
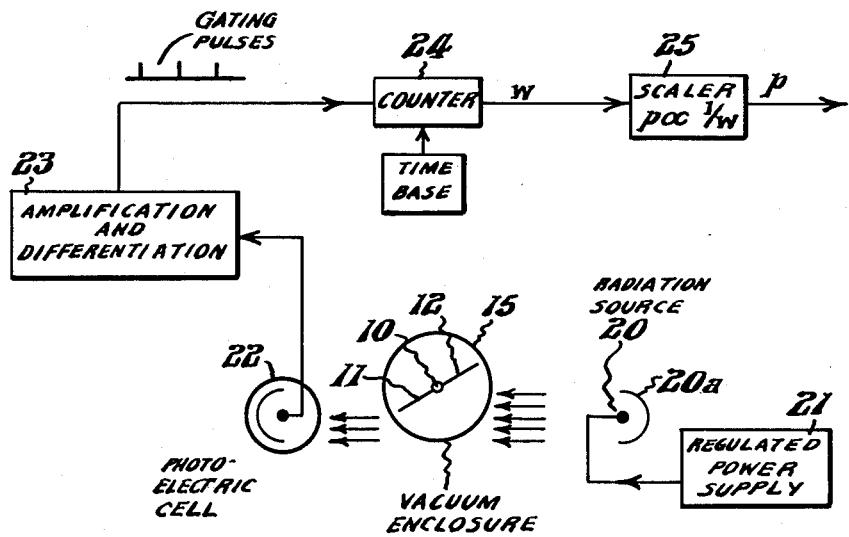
FIG. 1 shows in diagrammatic form a basic pressure gage according to my present invention.

Before describing in detail the circuitry of the new pressure gage as illustrated in FIG. 1, it may be helpful to briefly summarize the basic principles on which the gage operates.

If a sphere is suspended and made to rotate inside a container in which there is a rarified gas, the drag torque tending to oppose the rotation due to the impact of gas molecules on the sphere has been shown theoretically and confirmed experimentally to be proportional to the first power of the gas pressure $p$ and the angular rate of rotation $w$. See "Kinetic Theory of Gases," by Knudsen, 3rd edition (1950), pages 29–31. The drag torque is also proportional to the square root of $M/T$ where T is the absolute temperature of the gas and M its molecular weight. For a given gas and a controlled temperature, and for a given size sphere, the drag torque is proportional to the gas pressure and to the angular rate of rotation. More specifically, the drag torque $T_d$ is equal to the product of the gas pressure times the angular rate of rotation times a constant $K_d$ where $K_d$ is a proportionality constant dependent upon the configuration and the nature of the gas.

For the particular case of a sphere, the complete expression for $K_d$ is $$K_d = \frac{8\pi}{3} \cdot R^4 \cdot (43.75) \cdot 10^{-6} (M/T)^{1/2}$$

where R is the radius of the sphere in centimeters, T is the temperature of the gas in degrees Kelvin, and M is the molecular mass in grams.

For the above expression to hold true, the gap between the suspended sphere and the enclosure must be substantially smaller than the mean free path of the gas. At the low gas pressures for which the gage of the present invention is intended, this condition is easily met.

In the instrumentation of the gage, if a spherical configuration is not employed, a more complex expression for $K_d$ would result, which may have to be determined experimentally. However, in the pressure ranges for which the present gage is intended, the linear relationship between the drag torque and the gas pressure is not affected by the geometry of the sphere.

It has also been established theoretically as well as experimentally (see "The Pressure of Light," by J. H. Poynting, published by the London Society for Promoting Christian Knowledge, New York, E. S. Gorham (1910)), that radiation exerts a pressure in the direction of propagation numerically equal to the energy per unit volume in the radiation. In general, the force exerted upon a surface subject to radiation is dependent upon the intensity of the radiation, the geometry of the surface, and the surface characteristics. For example, a beam of parallel radiation striking a perfectly reflecting flat surface would produce a force on the surface given by the following expression:

$$F_c = 2 \cdot A \cdot p_c \cdot \cos^2 \alpha$$

where A is the area of the surface, $p_c$ is the radiation pressure, and $\alpha$ is the angle between the incident beam and the normal to the surface.

In the pressure gage of the present invention, radiation pressure is used to produce a control torque opposing the effect of the gas drag torque on the rotating surface described above. The principal merit in using radiation pressure for control purposes is that accurately controlled torques of a magnitude comparable to the very small drag torques occurring in high vacuums can be obtained.

FIG. 1 shows diagrammatically a pressure measurement system according to my present invention for computing the gas pressure from measured values of angular rotation while the radiation pressure is maintained constant. In FIG. 1, a radiation source 20, supplied by a regulated power supply 21, directs radiation energy toward one side of the winged sensor assembly causing it to rotate at an angular rate of rotation $w$. Twice each revolution radiation energy to the photo-electric pick-off cell 22 is completely blocked, namely, when the wings 11, 12 occupy a vertical position as seen in FIG. 1; and twice each rotation the full radiation pressure is impressed upon the photo-electric pick-off cell 22, namely, when the wings 11, 12 are horizontally disposed as seen in FIG. 1. Between complete blockage and complete illumination, the radiation reaching the photo-electric pick-off cell 22 rises from zero to a maximum along a sinusoidal curve. The photo-electric pick-off cell 22 thus produces pulses of current at a frequency equal to twice that of the rotational frequency of the winged sensor assembly. This alternating current is amplified and differentiated in a circuit 23 of known form to produce a series of gating pulses which are counted in a known form of counter 24, and a signal is produced by the counter which is proportional to the rate of rotation $w$. Since the gas pressure to be measured varies inversely with the rate of rotation of the wing assembly, the signal produced by counter 24, being proportional to the rate of rotation of the wing assembly, is transformed in the scaling circuit 25 to a pressure indication.

In the above description of the gage system of FIG. 1, it was assumed that the radiation pressure is maintained constant. As an alternative, instead of maintaining a constant radiation pressure and measuring the rate of rotation of the winged sensor assembly, the rate of rotation of the winged assembly may be maintained constant, and the gas pressure to be measured may be computed by measuring the value of radiation pressure required to maintain a constant angular rotation.

In the circuit of FIG. 1, the radiation pressure is maintained constant by regulating the power input to the radiation source. However, a more direct method is to compute the average intensity by integrating the output of photo-electric pick-off cell 22 and dividing it by the measured rate of rotation. This computation can also be used to compute the gas pressure provided the angular rate of rotation is maintained constant by a closed-loop technique.

It may be helpful to discuss the pressure measurement or pressure indication further.

In general terms, the equation of motion of the wing assembly under the influence of the radiation-pressure control torque $T_c$ and the gas retardation torque is given by $$I\frac{dw}{dt} + K_d \cdot p \cdot w = T_c$$

To compute the radiation-pressure control torque $T_c$, we assume a flat perfectly reflecting wing. If we take as a reference the position of the wing at which there is normal incidence of radiation and denote by $\theta$ any angle from that reference position, then the torque as a function of $\theta$ is given by the following equation:

$$T_c(\theta) = 2 \cdot A \cdot p_c \cdot \cos^2 \theta \cdot 1$$

To facilitate the solution of equation given previously for radiation-pressure control torque, it is desirable to define an average torque per revolution rather than an instantaneous one as given immediately above. Differentiating with respect to $\theta$ and replacing $d\theta$ by $d\theta/dt \cdot dt$, we obtain $$dT_c = -4 \cdot A \cdot p_c \cdot 1 \sin z\theta \cdot d\theta/dt \cdot dt$$

The instantaneous rate of rotation can be looked upon as consisting of an average rate $w_a$ corresponding to the value that would be obtained by measuring the period of rotation, and a superimposed modulation. Pressure measurements in accordance with the present invention are based upon steady-state conditions during which the modulation will be very small compared to the measured period of rotation. For the purpose of defining the control torque, and for this purpose only, it is reasonable to assume that $d\theta/dt$ is constant during the period of measurement, and is equal to the average rate of rotation $w_a$. Similarly, we can denote $\theta$ by $w_a \cdot t$. Thus, $$dT_c = -4 \cdot A \cdot p_c \cdot 1 \cdot w_a \cdot \sin zw_a t \cdot dt$$

Integrating the above expression, we obtain for the control torque per revolution $T_c = 8 \cdot A \cdot 1 \cdot p_c$.

For the above case, the solution of the equation of motion in terms of $w$ is $$w = \frac{8 \cdot A \cdot 1 p_c}{K_d \cdot p} + C_1 e - \frac{K_d p \cdot t}{I}$$

where $C_1$ = the constant of integration.

It is thus seen that the magnitude of the pressure to be measured can be obtained from the steady-state value of rotation $w$, namely, $$p = \frac{8 \cdot A \cdot 1 \cdot p_c}{K_d \cdot w} \text{ or } w = \frac{8 \cdot A \cdot 1 \cdot p_c}{K_d \cdot p}$$

It is seen then that the angular rate of rotation is directly proportional to the radiation pressure $p_c$ and inversely proportional to the gas pressure $p$.

In FIG. 1, the instrumentation of the pressure gage of the present invention is shown diagrammatically.

Before describing the circuitry and instrumentation of the new pressure gage, it may be helpful to discuss the various considerations which lead to the instrumentation shown in FIG. 1.

Previously herein, in discussing the principles of operation, it was indicated that certain fundamental assumptions would be made. It is assumed (1) that the gas pressure is essentially constant over the period of measurement, for example, over a half a period of rotation, and (2) that steady-state conditions with regard to rate of rotation have been attained. Instrumentation of the gage must therefore be compatible with these assumptions.

The assumption of constant gas pressure implies that the period of rotation must be short compared to the time rate of change of gas pressure. Specific values would, of course, depend on the intended application. However, for a most common usage, for example, where it is desired to indicate pressure in a vacuum enclosure while it is being pumped down, the assumption of constant gas pressure relative to the period of rotation appears to be easily complied with, since pump-down time in the ultra-high vacuum range is in the order of hours while the period of rotation of the gage is a fraction of a second. Thus, application of the gage need not be restricted merely to indicate an essentially constant vacuum.

FIG. 4 illustrates instrumentation of a gage capable of measuring gas pressure with maximum accuracy where the pressure is changing so fast that it cannot be assumed to be constant relative to the rate of rotation of the winged assembly.

Where it is required to track a changing vacuum with maximum accuracy, it is desirable to control the average rate of rotation as a function of the rate of change of gas pressure. Inasmuch as pressure measurements are made over measured time intervals, the rate of change of gas pressure is thus available for a comparison of computations over consecutive half periods. The instrumentation of the device should therefore include a control loop wherein the radiation intensity is modified based upon measurements of pressure and its rate of change so as to maintain the desired relationship between the average period of rotation and the rate of change of pressure. It should be noted, however, that insofar as the computation of gas pressure is concerned, the measured periods are to be used and not the reference values in the control loop.

Utilization of the rate-of-rotation control loop is directly related to the second fundamental assumption, namely, that computation of pressure is based upon steady-state values of rate of rotation. This implies that the response of the rate-of-rotation control must be fast in relation to the change of gas pressure. If the time constant for the gas pressure would be identified by $T_p$ and if the time constant of the rate-of-rotation control loop were to be identified by $T_w$, then the requirement to be met is that $T_w$ must be very much smaller than $T_p$. Based upon equation previously given for rate of rotation, the time constant for the system previously defined would be given by $$T_w = \frac{I}{K_d \cdot p} = \frac{7.5 \cdot 10^{-6}}{p} \text{ hours}$$

At a gas pressure of $10^{-6}$ mm. Hg, the time constant for the rate-of-rotation control loop $T_w$ would thus be 7.5 hours, and as the pressure decreased, the time constant for the rate-of-rotation control loop $T_w$ would further increase. This would not be satisfactory and alternate instrumentation must accordingly be used to improve the dynamic response of the rate-of-rotation control loop. In accordance with the present invention, as embodied in the FIG. 4 instrumentation, this is achieved by applying the radiation pressure during only a portion of each half period, and by making the duration of the pulse of applied radiation pressure a function of the rate of rotation. It is assumed that the pulse is centered at $\theta=0$, i.e., at the position of maximum instantaneous torque. To compute the torque applied per half period, we again integrate the equation previously given for $dT_c$ except that the limits of integration now correspond to the pulse duration.

As a result of integrating the equation for $dT_c$ previously given over the pulse duration, the following expression for the control torque per revolution (2 pulses) is obtained:

$$T_c = 4 \cdot A \cdot p_c \cdot 1 \cdot (1 - \cos w_a \Delta t)$$

The control torque is thus composed of two components, one of which is dependent upon the pulse duration $\Delta t$. To achieve the desired result, it is specified that the duration of the pulse $\Delta t$ be computed from the following relationship:

$$K_f \cdot w_a = \cos w_a \cdot \Delta t$$

The constant $K_f$ can be considered a feedback coefficient, the magnitude of which is a design choice. Since the modulations of the rate of rotation are to be maintained suitably small, and since all computations are to be based upon the measured values of the average rate of rotation over each half period, the average rate of rotation $w_a$ in the left hand side of the above equation can be replaced by the instantaneous value of rotation $w$. This implies that the torque applied during the pulse is considered to be spread over the entire half period and consists of a constant, minus a component proportional to the instantaneous rate of rotation. On this basis, the equation of motion becomes $$I\frac{dw}{dt} + K_d \cdot p \cdot w = 4 \cdot A \cdot 1 \cdot p \cdot (1 - K_f w)$$

The solution of the above equation for $w$ as a function of time is given by $$w = \frac{4 \cdot A \cdot 1 \cdot p_c}{4 \cdot A \cdot 1 \cdot p_c \cdot K_f + K_d \cdot p} + C_2 \cdot e - \frac{t}{I}(4 \cdot A \cdot 1 \cdot p_c \cdot K_f + K_d \cdot p)$$

A comparison of the above equation with the equation previously given for rate of rotation $w$ shows that the effect of introducing $K_f$ is to reduce the time constant, and also to reduce the steady-state value of the rate of rotation $w$ for a given radiation intensity $P_c$ and gas pressure $p$. Furthermore, since $K_d$ times $p$ is small compared to $4A \cdot 1 \cdot p_c \cdot K_f$, the time constant is essentially independent of the gas pressure. Computation of the pressure is again done from the steady-state value of the rate of rotation measured over the half period of rotation. In terms of measured quantities, the pressure is thus given by $$p = \frac{4 \cdot A \cdot 1 \cdot p_c}{K_d \cdot \pi} \cdot P/2 \left(1 - \cos \pi \frac{\Delta t}{P/2}\right)$$

where $P = 2\pi/w_a$—period of rotation.

It will be understood from the discussion thus far that FIG. 1 shows the instrumentation of my new pressure gage where the rate of change of gas pressure is slow compared with the rate of rotation of the winged assembly, and that in such cases the valid assumption is made that the gas pressure is constant. The gage shown in FIG. 1 is the basic gage, and will be suitable for many applications.

Where the assumption that the gas pressure is constant cannot be made, the more complex instrumentation shown in FIG. 4 can be employed.

Referring again to FIG. 1, the radiation source 20 may preferably be a light source, powered by a regulated power supply 21 so that the quantity of light emitted is constant. Means, which may include a directional reflector 20a, are employed to confine the light waves to a narrow path directed toward a radiation-energy responsive device, which may preferably be a photoelectric cell 22. The cell 22 is adapted to convert variations in light energy into corresponding variations in electrical energy. The vacuum enclosure 15, containing the winged assembly 11, 12, is so positioned in the light path that the light waves impinge on only one wing at a time. In FIG. 1, wing 11 is shown to be in the path of the light waves. The radiation pressure on wing 11 causes the wing to move in a direction away from the source of lightwave energy, thereby causing the winged assembly to rotate clockwise. The momentum of the moving winged assembly is sufficient to cause the winged assembly 11, 12 to move beyond its dead center point, at which the two wings are disposed parallel to the light path, and thus, wing 12 enters the light path and, in response to the light-wave energy impressed thereon, is moved in a clockwise direction.

As the winged assembly 11, 12 thus rotates, the light energy received by the photo-electric cell 22 varies from zero to a maximum twice per revolution of the winged assembly. Cell 22 thus develops an electrical sine wave signal at a frequency which is twice that of the rotating frequency of the winged assembly.

The sine wave signal developed in cell 22 is applied to an amplifying and differentiating circuit 23 to produce a series of gating pulses which are applied to a time-based counting circuit 24 to produce an output voltage which is proportional to the number of gating pulses per unit period of time. The output of counting circuit 24 is thus proportional to the rate of rotation of the winged assembly 11, 12; and since the rate of rotation of the winged assembly is inversely proportional to the gas pressure in the vacuum enclosure 15, the signal delivered by counting circuit 24 may be converted, in the scaling circuit 25, to indicate pressure.

The pressure gage of FIG. 1 offers a practical means for the direct and accurate measurement of very low pressures, due to the following key factors:

First, by using radiation pressure as the control torque, magnitudes comparable to the very small gas-pressure retarding torques can be generated with the necessary precision. Furthermore, since radiation pressure is numerically equal to the energy flux and since energy flux is the basis for measuring the magnitude of the applied torque, very small torque levels, in the order of milli- to microdyne-centimeters, are determined and controlled by measuring energy fluxes in the order of watts.

Second, the use of a continuously rotating sensing element of very light weight construction permits the utilization of suspension means which are compatible with the very low sensing and control torques involved. Continuous rotation effectively eliminates the problem of random torque levels associated with instrumentation approaches in which a static position is the null reference for measurement and the fact that averages over a complete rotation are used further reduces the effect of residual torques due to the suspension.

Third, performance of the gage with regard to sensitivity and dynamic response is largely dependent upon the ability to accurately measure small time intervals. However, the ability to accurately measure small time intervals is one of the most advanced instrumentation and computational technologies of today. Performance capabilities of my new pressure gage are therefore principally a function of the degree of sophistication of the time measurement circuitry ranging from off-the-shelf components for the basic laboratory gage to special circuitry for more specialized applications.

As previously indicated, FIG. 1 is a diagrammatic representation of the basic pressure gage, useful where the rate of change of gas pressure is slow relative to the speed of rotation of the winged assembly, as will frequently be the case. FIG. 4 is a block diagram of the instrumentation of a gage where it is required to track a changing vacuum for maximum accuracy. In the latter case, it is desired to control the average rate of rotation of the winged assembly as a function of the rate of change of gas pressure. Since the pressure measurements are made over measured time intervals, the rate of change of gas pressure is available from a comparison of computations over consecutive half periods. Thus, the instrumentation of the device includes a control loop wherein the radiation intensity is modified based upon measurements of gas pressure and of the rate of change of gas pressure so as to maintain the desired relationship between the average period of rotation and the rate of change in gas pressure.

In FIG. 4, the light or radiation pressure is supplied during only a portion of each half period and the duration of the radiation pulse is made a function of the rate of rotation of the winged assembly. The radiation pulse is applied at the position of maximum instantaneous torque.

In the circuit of FIG. 4, the output of the photo cell 122 is applied to an amplification and differentiation circuit 123 to produce gating pulses which are applied to a time-based counting circuit 124. Since the light-wave or radiation energy is applied by source 120 in a pulsed manner during a portion only of each half period, a first signal corresponding to the measured pulse duration and a second signal corresponding to the measured period of rotation are derived from the counting circuit 124.

The output of the photo cell 122 is also applied to an integration circuit 126, the output of which is applied to a first computation network 127. The gating pulses from the amplification and differentiation circuits 123 are also applied to the computation network 127, and derived from network 127 is a signal corresponding to the radiation pressure $p_c$. This signal is applied to a second computation network, along with the measured pulse duration and measured period of rotation signals produced by the counting circuit 124. Derived from the second computation network 128 is a first signal corresponding to gas pressure, and a second signal corresponding to the rate of change of the gas pressure. Both of these output signals of the computation network 128, one corresponding to gas pressure and the other corresponding to rate of change of gas pressure, are applied to a network 129, to derive a signal corresponding to the measured period of rotation. This signal is compared with that output signal of the counting circuit 124 which corresponds to the measured period of rotation and a difference signal is obtained which is applied to a radiation intensity control circuitry 130, the output of which is applied to the power supply 121 for modifying the radiation intensity of the radiation source 120, thereby to control the period of rotation of the winged assembly 115 based on the measurement of gas pressure and the rate of change of gas pressure.

The signal derived from network 129 is also applied to a network 131 for developing a signal for application to switch 132 for controlling the duration of the pulse supplied by the light or radiation source 120.

In FIGS. 1 and 4, the components have been illustrated diagrammatically in block form since the electronic circuitry for accomplishing the various functions are known in the art. Electronic circuits for accomplishing differentiation, integration, counting, scaling, multiplication, division, addition, and subtraction are well known in the electronics art, and so far as my present invention is concerned, any suitable circuit may be used to accomplish the function indicated.

With regard to the magnitude of the radiation pressure, it may be noted that the pressure due to solar radiation at the earth's distance from the sun is equal to about $4.5 \times 10^{-6}$ dynes per square centimeter. In the pressure gage described herein, only one square centimeter need be illuminated, and the source can be located very close to the wing. For a continuously applied radiation pressure, a reasonable maximum value is $2 \cdot 10^{-3}$ dynes per square centimeter. Using this as the maximum radiation pressure, and assuming a gas pressure of $10^{-6}$ millimeters of mercury, gives a calculated speed of rotation for the one-square-centimeter-per-wing assembly of FIGS. 1–4 of 191 revolutions per second. As the gas pressure goes down, the choice exists to permit the speed to increase or to reduce the radiation pressure to maintain a desired rate of rotation.

A larger period of rotation, i.e., a lesser speed of rotation, is beneficial because it serves a three-fold purpose. First, it reduces the time constant of the control loop.

Second, it permits relatively larger pulse durations. Third, the accuracy of the time measurement is improved.

However, as previously indicated, the rate of rotation must be geared to the rate of change of the gas pressure, and must be considerably smaller than the time constant of the control loop.

If a rate of rotation of two revolutions per second is assumed, and assuming a radiation pressure of $2 \cdot 10^{-3}$ dynes/sq. cm., the value of the control loop time constant is 2.3 minutes. This is satisfactory for most measurements in the low pressure range. To reduce the time constant of the control loop, and assuming a solar source of radiation energy, the radiation pressure could nonetheless be increased by utilizing energy storage and discharge techniques.

The pulse duration of the radiation pulse, assuming the same values of radiation pressure and rate of rotation as used above to give a control loop time constant of 2.3 minutes, and assuming a gas pressure of $10^{-10}$ mm. Hg, gives a pulse duration for the radiation pulse of 0.3 millisecond. This is of such value as to allow the application of present state-of-the-art time measurement techniques with sufficient margin for a wide range of design variation.

FIG. 5 shows a mechanization of a slightly modified form of pressure gage. In FIG. 5, the rotatable winged sensing element 200 is contained in a vacuum enclosure 215 having two windows 201 and 202 positioned as indicated. The magnetic suspension components (not shown) are all external to the vacuum enclosure and may be generally similar to those shown in FIG. 2. The two windows 201 and 202 are of good optical quality and are provided in such positions as to admit the radiation from the source 220 into the enclosure 215 and to permit it to leave after reflection from one of the vanes of the sensing element 200. The optical material used in windows 201, 202 is also used in a filter 204 located at the source 220 of the radiation beam so that any radiation which would not pass into the chamber 215 because of the filtering effects of the window 201 is removed at the source so as not to influence the measurement of radiation intensity.

Measurement of radiation intensity, in FIG. 5, is accomplished by diverting, as by the half-mirror beam splitter 205, a small portion of the radiation into a calorimetric device 206, the output of which is calibrated in terms of radiation pressure. For the purposes of many pressure measurements, it is adequate to use a constant setting of radiation intensity. This can be manually adjusted as needed, as by potentiometer 207. The instrumentation shown in FIG. 5 provides a closed-loop control for maintaining the chosen value of radiation intensity by controlling the power supply to the radiation source.

FIG. 5 also shows a means for pulsing the radiation pressure on the vanes by interposing two semi-circular sectors 208 and 209. These are shown mounted on a differential 240 and are slaved to rotate at twice the speed of the vane assembly 200. Although different means for accomplishing this result are available, the arrangement shown in FIG. 5 utilizes the radiation beam reflected from the vane of the sensing element 200 to actuate a photocell 222 thus providing gating pulses into an electronic counter 224. An analog output of the counter, which is proportional to the rate of rotation of the vane sensing element 200, is then used to control the motor 241 which drives the two sectors 208, 209 at twice the speed of the vane assembly. In this manner, it is also possible to assure that the radiation pulses are applied at the desired angular position of the vane since the geometrical position of the windows 201, 202 will determine when a light pulse is transmitted to the photo-cell 222.

By mounting the two sectors 208, 209 on a differential 240, it is possible to adjust their phase relationship by controlling the third shaft. This offers a means for changing the pulse duration and could, if desired, be made an integral part of the speed control servo. However, as shown in FIG. 5, it may be assumed that the third shaft will be preset manually, similar to the manner in which radiation intensity is to be adjusted. The principal purpose of varying the pulse duration is to reduce the time constant of the system so that the vane assembly will respond quickly to changes in pressure. But the mechanization as shown in FIG. 5 already contains this feature to some degree because the pulse duration is dependent upon the rate of rotation of the sectors 208, 209 as well as upon their angular spacing. Thus, even with a fixed setting, the control torque will contain a component proportional to rate of rotation and the system need not be complicated by the introduction of a dynamic variation of the spacing of the sectors. The setting can, of course, be adjusted manually to select the desired operating conditions.

Computation of the gas pressure would be done on the basis of measured rates of rotation and radiation intensity.

It is apparent that considerable simplification of the system shown in FIG. 5 could be achieved if the radiation were allowed to strike the vanes continuously since this would eliminate the sector assembly and its drive and would also result in simplification of the analytical formulations upon which the computation of gas pressure is based. However, certain advantages are derived by pulsing the radiation over a short time period. First, the radiation is confined geometrically so that it can be brought in and out of the vacuum chamber through small ports. This minimizes secondary reflections from the walls and absorption by the gas molecules. Second, reflectivity of a surface is known to vary as a function of the direction of illumination. Thus, by restricting the range of angle during which radiation pressure is applied, the coefficient of reflectivity can be more accurately established. Third, the mechanization of the pressure gage shown in FIG. 5 makes available a means for changing the operating speed without changing the intensity of the radiation source, viz., by changing the angular spacing between the sectors. Fourth, the mechanization shown can also conveniently be used to introduce known transients which may serve to calibrate the gage with an unknown gas or to evaluate the drag coefficient when the nature of the gas and its pressure are known. And last, as already indicated, control of the third gear of the differential can be made an integral part of the speed control servo so as to provide more flexibility in designing the system for the desired dynamic response.

While the preferred embodiment of this invention has been described in some detail, it will be obvious to one skilled in the art that various modifications may be made without departing from the invention as hereinafter claimed.

Having described my invention, I claim:

1. Apparatus for measuring very small pressure produced forces, comprising in combination,
    (1) a sensor device rotatable about a fixed position axis of rotation and including,
        (a) a target element upon which the pressure produced force to be measured acts,
        (b) a radiation receiving surface coupled to said target element in fixed relation thereto disposed laterally of said axis of rotation and upon which surface radiation is selectively directable to produce a torque tending to rotate said sensor about said axis of rotation in a first sense,
        (c) said target element extending laterally of said axis of rotation so that a net pressure produced force to be measured acting thereon produces a torque tending to rotate said sensor in a second sense opposite to said first sense about said axis of rotation,
    (2) means for effecting communication between a pressure producing source and the target element,
    (3) means for suspending said sensor for rotation about said fixed position axis, (4) control signal generating monitor means effective to detect rotation of said sensor and generate control signals uniquely corresponding to said rotation, (5) radiation projecting means disposed for projecting radiation onto the said radiation receiving surface of said sensor, (6) control means coupled to said monitor means and to said radiation projecting means effective responsive to the control signals generated by said monitor means to control the quanta of radiation projected onto said sensor to thereby produce a torque on said sensor equal and opposite to that produced by the force being measured, and (7) means responsive to the control signals generated by said monitor means effective to indicate the magnitude of the net pressure produced force to be measured.

2. Apparatus for measuring very small pressure produced forces, comprising in combination, (1) a sensor device rotatable about a fixed position axis of rotation and including, (a) a sensor support element through which passes the rotational axis of said sensor, (b) a target element fixedly secured to said sensor support element and upon which the pressure produced force to be measured acts, (c) a radiation receiving surface coupled to said target element in fixed relation thereto disposed laterally of said axis of rotation and upon which surface radiation is selectively directable to produce a torque tending to rotate said sensor about said axis of rotation in a first sense, (d) said target element extending laterally of said axis of rotation so that a net pressure produced force to be measured acting thereon produces a torque tending to rotate said sensor in a second sense opposite to said first sense about said axis of rotation, (2) means for effecting communication between a pressure producing source and the target element, (3) means for suspending said sensor by its support element for rotation about said fixed position axis, (4) control signal generating monitor means effective to detect rotation of said sensor and generate control signals uniquely corresponding to said rotation, (5) radiation projecting means disposed for projecting radiation onto the said radiation receiving surface of said sensor, (6) control means coupled to said monitor means and to said radiation projecting means effective responsive to the control signals generated by said monitor means to control the quanta of radiation projected onto said sensor to thereby produce a torque on said sensor equal and opposite to that produced by the force being measured, and (7) means responsive to the control signals generated by said monitor means effective to indicate the magnitude of the net pressure produced force to be measured.

3. The apparatus as set forth in claim 2 wherein said sensor support element is a rod made of magnetically susceptible material, and said sensor suspending means is a magnetic suspension coil electromagnetically coupled to said rod of magnetically susceptible material by an electromagnetic field of sufficient strength to suspend said sensor for rotation about the longitudinal axis of said rod.

4. Apparatus for measuring very small pressure produced forces, comprising in combination, (1) a sensor device rotatable about a fixed position axis of rotation and including, (a) a target element upon which the pressure produced force to be measured acts, (b) a radiation receiving surface coupled to said target element in fixed relation thereto disposed laterally of said axis of rotation and upon which surface radiation is selectively directable to produce a torque tending to rotate said sensor about said axis of rotation in a first sense, (c) said target element extending laterally of said axis of rotation so that a net pressure produced force to be measured acting thereon produces a torque tending to rotate said sensor in a second sense opposite to said first sense about said axis of rotation, (2) means for effecting communication between a pressure producing source and the target element, (3) means for suspending said sensor for rotation about said fixed position axis, (4) control signal generating monitor means effective to detect rotation of said sensor and generate control signals uniquely corresponding to said rotation, (5) radiation projecting means disposed for projecting radiation onto the said radiation receiving surface of said sensor, (6) means responsive to the control signals generated by said monitor means effective to indicate the magnitude of the net pressure produced force to be measured.

5. A pressure gage for measuring very low gas pressures, said gage comprising; a source of light-wave energy; a responsive device positioned to receive light waves from said source and to develop an electrical signal proportional to the light energy received; an enclosure containing gas, the pressure of which is to be measured, a winged assembly including a pair of opposed wings, means for freely suspending said winged assembly for rotation within said enclosure about an axis extending between said wings, said enclosure and said winged assembly being so positioned between said source of light-wave energy and said responsive device that only one wing at a time lies in the path of said light waves between said source and said responsive device, each of said wings having a radiation receiving surface disposed laterally of said axis of rotation and upon which surface radiation from said light source is directable to produce a torque effective to rotate said sensor about said axis of rotation against the molecular resistance of the gas in the said enclosure, whereby the light energy delivered to said responsive device is alternately blocked and unblocked as said winged assembly rotates due to the radiation pressure exerted against one of its wings; means coupled to said responsive device for amplifying and differentiating the electrical output signal of said responsive device to develop a series of electrical pulses; a time-based counting circuit coupled to said differentiating means for producing an electrical signal proportional to the rate of rotation of said winged assembly; and means coupled to said counting circuit for converting said produced electrical signal to a pressure indication.

6. A pressure gauge for measuring variable gas pressures, comprising in combination, (a) a source of radiation energy, (b) a radiation energy responsive device positioned to receive radiation energy from said source and operative to develop an electrical signal proportional to the radiation energy received, (c) an enclosure containing gas, the pressure of which is to be measured, (d) a sensor device within said enclosure rotatable about a fixed position axis of rotation and including a target element having a radiation receiving surface disposed laterally of said axis of rotation and upon which surface radiation from said source of radiation energy is directable to produce a torque effective to rotate said sensor about said axis of rotation in a first sense, the aforesaid radiation energy responsive device positioned to receive radiation energy from said source being so positioned that it receives such radiation energy only when said target element traverses a particular arc of its rotational path, so that the rate at which electrical signals are developed by said radiation energy responsive device is determined by the rate of rotation of said target element within the said enclosure, (e) counting means coupled to and responsive to the electrical signals generated by said radiation energy responsive device effective to generate an electrical signal proportional to the number of signals received from said radiation energy responsive device within a clocked time interval, and (f) means coupled to said counting means and responsive to the signals generated by the latter for converting the counting means signal to a pressure indication.

7. The apparatus as set forth in claim 6 further including switch means coupled to said source of radiation energy effective to pulse said source on and off at a rate controllable by the output signal of said counter means, and means coupling the output signals of said counter means to said switch means.

References Cited by the Examiner

UNITED STATES PATENTS 2,723,562  11/55  Lutz et al. _____ 73—231

OTHER REFERENCES

Beams et al.: Review of Scientific Instruments, vol. 33, pages 151–155 (1962).

Neher: American Journal of Physics, vol. 29, pages 666 to 668 (1961).

RICHARD C. QUEISSER, *Primary Examiner*.

JOSEPH P. STRIZAK, *Examiner*.